(12) United States Patent
Oehring et al.

(10) Patent No.: US 10,598,258 B2
(45) Date of Patent: Mar. 24, 2020

(54) MULTI-PLUNGER PUMPS AND ASSOCIATED DRIVE SYSTEMS

(71) Applicant: U.S. Well Services, Inc., Houston, TX (US)

(72) Inventors: Jared Oehring, Houston, TX (US); Lon Robinson, Houston, TX (US); Brandon N. Hinderliter, Houston, TX (US); Alexander James Christinzio, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/210,807

(22) Filed: Dec. 5, 2018

(65) Prior Publication Data

US 2019/0249754 A1 Aug. 15, 2019

Related U.S. Application Data

(60) Provisional application No. 62/594,912, filed on Dec. 5, 2017.

(51) Int. Cl.
*E21B 43/20* (2006.01)
*F16H 3/52* (2006.01)
(Continued)

(52) U.S. Cl.
CPC ............... *F16H 3/52* (2013.01); *E21B 37/00* (2013.01); *E21B 43/20* (2013.01); *E21B 43/26* (2013.01);
(Continued)

(58) Field of Classification Search
None
See application file for complete search history.

(56) References Cited

U.S. PATENT DOCUMENTS 1,656,861 A 1/1928 Leonard
1,671,436 A 5/1928 Melott
(Continued)

FOREIGN PATENT DOCUMENTS

AU 2007340913 7/2008
CA 2406801 11/2001
(Continued)

OTHER PUBLICATIONS

Non-Final Office Action dated Feb. 12, 2019 in related U.S. Appl. No. 16/170,695.
(Continued)

*Primary Examiner* — D. Andrews
(74) *Attorney, Agent, or Firm* — Hogan Lovells US LLP (57) ABSTRACT

A hydraulic fracturing system for fracturing a subterranean formation is described according to various embodiments. In an embodiment, the system can include a multi-plunger hydraulic fracturing pump fluidly connected to a well associated with the subterranean formation, the multi-plunger pump configured to pump fluid into a wellbore associated with the well at a high pressure so that the fluid passes from the wellbore into the subterranean formation and fractures the subterranean formation. In an embodiment, a plurality of motors can be positioned to power the multi-plunger pump, and a planetary gear train can have a plurality of pinion gears in rotational contact with each of the plurality of motors. In an embodiment, a gear ratio of the planetary gear train and a speed at which the plurality of motors operates can be selected so as to limit a maximum pump speed associated with the multi-plunger pump.

20 Claims, 10 Drawing Sheets

(51) Int. Cl.

| | | |
|---|---|---|
| *F04B 17/03* | (2006.01) | |
| *F04B 23/04* | (2006.01) | |
| *F04B 15/02* | (2006.01) | |
| *F04B 47/02* | (2006.01) | |
| *E21B 43/26* | (2006.01) | |
| *E21B 37/00* | (2006.01) | |
| *F04B 49/20* | (2006.01) | |
| *F16H 39/02* | (2006.01) | |

(52) U.S. Cl.
CPC .............. *F04B 15/02* (2013.01); *F04B 17/03* (2013.01); *F04B 23/04* (2013.01); *F04B 47/02* (2013.01); *F04B 49/20* (2013.01); *F16H 39/02* (2013.01); *F16H 2200/2007* (2013.01)

(56) References Cited

U.S. PATENT DOCUMENTS

| | | |
|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,407,796 A | 9/1946 | Page |
| 2,416,848 A | 3/1947 | Rothery |
| 2,753,940 A | 7/1956 | Bonner |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,006,044 A | 4/1991 | Walker, Sr. |
| 5,025,861 A | 6/1991 | Huber et al. |
| 5,050,673 A | 9/1991 | Baldridge |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,366,324 A | 11/1994 | Arlt |
| 5,422,550 A | 6/1995 | McClanahan |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,776,227 B2 | 8/2004 | Beida |
| 6,802,690 B2 | 10/2004 | Plan |
| 6,808,303 B2 | 10/2004 | Fisher |
| 6,931,310 B2 | 8/2005 | Shimizu et al. |
| 6,936,947 B1 | 8/2005 | Leijon |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,926,562 B2 | 4/2011 | Poitzsch |
| 7,977,824 B2 | 7/2011 | Halen et al. |
| 7,984,757 B1 | 7/2011 | Keast |
| 8,037,936 B2 | 10/2011 | Neuroth |
| 8,054,084 B2 | 11/2011 | Schulz et al. |
| 8,083,504 B2 | 12/2011 | Williams |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,534,235 B2 | 9/2013 | Chandler |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,774,972 B2 | 7/2014 | Rusnak et al. |
| 8,789,601 B2 | 7/2014 | Broussard |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,067,182 B2 | 6/2015 | Nichols |
| 9,103,193 B2 | 8/2015 | Coll |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |

(56) References Cited

U.S. PATENT DOCUMENTS

| | | |
|---|---|---|
| 9,175,554 B1 | 11/2015 | Watson |
| 9,206,684 B2 | 12/2015 | Parra |
| 9,322,239 B2 | 4/2016 | Angeles Boza et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,728,354 B2 | 8/2017 | Skolozdra |
| 9,738,461 B2 | 8/2017 | DeGaray |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,196,878 B2 | 2/2019 | Hunter |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,309,205 B2 | 6/2019 | Randall |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,436,026 B2 | 10/2019 | Ounadjela |
| 2002/0169523 A1 | 11/2002 | Ross et al. |
| 2003/0056514 A1 | 3/2003 | Lohn |
| 2003/0138327 A1 | 7/2003 | Jones et al. |
| 2004/0040746 A1 | 3/2004 | Niedermayr |
| 2004/0102109 A1 | 5/2004 | Cratty et al. |
| 2004/0167738 A1 | 8/2004 | Miller |
| 2005/0061548 A1 | 3/2005 | Hooper |
| 2005/0116541 A1 | 6/2005 | Seiver |
| 2005/0274508 A1 | 12/2005 | Folk |
| 2006/0052903 A1 | 3/2006 | Bassett |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0085541 A1 | 4/2012 | Love et al. |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1 | 8/2014 | Burnette |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine et al. |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |

(56) References Cited

U.S. PATENT DOCUMENTS

| | | |
|---|---|---|
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0265457 A1 | 9/2016 | Stephenson |
| 2016/0273328 A1 | 9/2016 | Oehring |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0051732 A1 | 2/2017 | Hemandez et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0145918 A1 | 5/2017 | Oehring |
| 2017/0146189 A1 | 5/2017 | Herman |
| 2017/0159570 A1 | 6/2017 | Bickert |
| 2017/0218727 A1 | 8/2017 | Oehring |
| 2017/0218843 A1 | 8/2017 | Oehring |
| 2017/0222409 A1 | 8/2017 | Oehring |
| 2017/0226839 A1 | 8/2017 | Broussard |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0328179 A1 | 11/2017 | Dykstra |
| 2017/0369258 A1 | 12/2017 | DeGaray et al. |
| 2018/0028992 A1 | 2/2018 | Stegemoeller |
| 2018/0038216 A1 | 2/2018 | Zhang |
| 2018/0156210 A1 | 6/2018 | Oehring |
| 2018/0183219 A1 | 6/2018 | Oehring |
| 2018/0216455 A1 | 8/2018 | Andreychuk |
| 2018/0245428 A1 | 8/2018 | Richards |
| 2018/0258746 A1 | 9/2018 | Broussard |
| 2018/0274446 A1 | 9/2018 | Oehring |
| 2018/0320483 A1 | 11/2018 | Zhang |
| 2018/0363437 A1 | 12/2018 | Coli |
| 2019/0003329 A1 | 1/2019 | Morris |
| 2019/0010793 A1 | 1/2019 | Hinderliter |
| 2019/0063309 A1 | 2/2019 | Davis |
| 2019/0100989 A1 | 4/2019 | Stewart |
| 2019/0112910 A1 | 4/2019 | Oehring |
| 2019/0120024 A1 | 4/2019 | Oehring |
| 2019/0128080 A1 | 5/2019 | Ross |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0292866 A1 | 9/2019 | Ross |
| 2019/0292891 A1 | 9/2019 | Kajaria |
| 2019/0316447 A1 | 10/2019 | Oehring |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| JP | 2004264589 | 9/2004 |
| WO | 2016/144939 | 9/2016 |
| WO | 2016/160458 | 10/2016 |

OTHER PUBLICATIONS

International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
International Search Report and Written Opinion dated Apr. 10, 2019 in corresponding PCT Application No. PCT/US2019/016635.

(56) References Cited

OTHER PUBLICATIONS

Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
International Search Report and Written Opinion dated Jul. 9, 2019 in corresponding PCT Application No. PCT/US2019/027584.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Nov. 26, 2019 in related PCT Application No. PCT/US19/51018.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.

Plunger Critical Speed Calculations

Plunger Critical Speed = 32 in/sec (based on 120 rpm crankshaft speed on 8" stroke pump)
Plunger Maximum Speed = 40 in/sec (based on 150 rpm crankshaft speed on 8" stroke pump)

| Bore | Pump Stroke (in.) | Volume per rev. (BBL) | | | | Crankshaft rpm | | Discharge Rates, (BPM) at Critical Speed | | | | Discharge Rates, (BPM) at Maximum Speed | | | |
|---|---|---|---|---|---|---|---|---|---|---|---|---|---|---|---|
| | | Triplex | Quint | 9 Plunger | 13 Plunger | Critical | Maximum | Triplex | Quint | 9 Plunger | 13 Plunger | Triplex | Quint | 9 Plunger | 13 Plunger |
| 2.75" Bore | 8 | 0.01469 | 0.02449 | 0.04408 | 0.06367 | 120.00 | 150.00 | 1.76 | 2.94 | 5.29 | 7.64 | 2.20 | 3.67 | 6.61 | 9.55 |
| | 9 | 0.01653 | 0.02755 | 0.04959 | 0.07163 | 106.67 | 133.33 | | | | | | | | |
| | 10 | 0.01837 | 0.03061 | 0.05510 | 0.07959 | 96.00 | 120.00 | | | | | | | | |
| | 11 | 0.02020 | 0.03367 | 0.06061 | 0.08754 | 87.27 | 109.09 | | | | | | | | |
| | 12 | 0.02204 | 0.03673 | 0.06612 | 0.09550 | 80.00 | 100.00 | | | | | | | | |
| | 13 | 0.02388 | 0.03979 | 0.07163 | 0.10346 | 73.85 | 92.31 | | | | | | | | |
| 3.0" Bore | 8 | 0.01749 | 0.02914 | 0.05246 | 0.07577 | 120.00 | 150.00 | 2.10 | 3.50 | 6.29 | 9.09 | 2.62 | 4.37 | 7.87 | 11.37 |
| | 9 | 0.01967 | 0.03279 | 0.05903 | 0.08524 | 106.67 | 133.33 | | | | | | | | |
| | 10 | 0.02186 | 0.03643 | 0.06557 | 0.09471 | 96.00 | 120.00 | | | | | | | | |
| | 11 | 0.02404 | 0.04007 | 0.07213 | 0.10419 | 87.27 | 109.09 | | | | | | | | |
| | 12 | 0.02623 | 0.04371 | 0.07869 | 0.11366 | 80.00 | 100.00 | | | | | | | | |
| | 13 | 0.02841 | 0.04736 | 0.08524 | 0.12313 | 73.85 | 92.31 | | | | | | | | |
| 3.25" Bore | 8 | 0.02052 | 0.03156 | 0.06156 | 0.08893 | 120.00 | 150.00 | 2.46 | 4.10 | 7.39 | 10.67 | 3.08 | 5.13 | 9.23 | 13.34 |
| | 9 | 0.02309 | 0.03848 | 0.06926 | 0.10004 | 106.67 | 133.33 | | | | | | | | |
| | 10 | 0.02565 | 0.04275 | 0.07696 | 0.11116 | 96.00 | 120.00 | | | | | | | | |
| | 11 | 0.02822 | 0.04703 | 0.08465 | 0.12227 | 87.27 | 109.09 | | | | | | | | |
| | 12 | 0.03078 | 0.05130 | 0.09235 | 0.13339 | 80.00 | 100.00 | | | | | | | | |
| | 13 | 0.03335 | 0.05558 | 0.10004 | 0.14450 | 73.85 | 92.31 | | | | | | | | |
| 3.5" Bore | 8 | 0.02380 | 0.03967 | 0.07140 | 0.10313 | 120.00 | 150.00 | 2.86 | 4.76 | 8.57 | 12.38 | 3.57 | 5.95 | 10.71 | 15.47 |
| | 9 | 0.02677 | 0.04462 | 0.08032 | 0.11602 | 106.67 | 133.33 | | | | | | | | |
| | 10 | 0.02975 | 0.04958 | 0.08925 | 0.12892 | 96.00 | 120.00 | | | | | | | | |
| | 11 | 0.03272 | 0.05454 | 0.09817 | 0.14181 | 87.27 | 109.09 | | | | | | | | |
| | 12 | 0.03570 | 0.05950 | 0.10710 | 0.15470 | 80.00 | 100.00 | | | | | | | | |
| | 13 | 0.03867 | 0.06446 | 0.11602 | 0.16759 | 73.85 | 92.31 | | | | | | | | |
| 4.0" Bore | 8 | 0.03109 | 0.05181 | 0.09326 | 0.13470 | 120.00 | 150.00 | 3.73 | 6.22 | 11.19 | 16.16 | 4.66 | 7.77 | 13.99 | 20.21 |
| | 9 | 0.03497 | 0.05829 | 0.10491 | 0.15154 | 106.67 | 133.33 | | | | | | | | |
| | 10 | 0.03886 | 0.06476 | 0.11657 | 0.16838 | 96.00 | 120.00 | | | | | | | | |
| | 11 | 0.04274 | 0.07124 | 0.12823 | 0.18522 | 87.27 | 109.09 | | | | | | | | |
| | 12 | 0.04663 | 0.07771 | 0.13989 | 0.20206 | 80.00 | 100.00 | | | | | | | | |
| | 13 | 0.05051 | 0.08419 | 0.15154 | 0.21889 | 73.85 | 92.31 | | | | | | | | |
| 4.5" Bore | 8 | 0.03934 | 0.06557 | 0.11803 | 0.17049 | 120.00 | 150.00 | 4.72 | 7.87 | 14.16 | 20.46 | 5.90 | 9.84 | 17.70 | 25.57 |
| | 9 | 0.04426 | 0.07377 | 0.13279 | 0.19180 | 106.67 | 133.33 | | | | | | | | |
| | 10 | 0.04918 | 0.08196 | 0.14754 | 0.21311 | 96.00 | 120.00 | | | | | | | | |
| | 11 | 0.05410 | 0.09016 | 0.16229 | 0.23442 | 87.27 | 109.09 | | | | | | | | |
| | 12 | 0.05901 | 0.09836 | 0.17704 | 0.25573 | 80.00 | 100.00 | | | | | | | | |
| | 13 | 0.06393 | 0.10655 | 0.19180 | 0.27704 | 73.85 | 92.31 | | | | | | | | |
| 5.0" Bore | 8 | 0.04857 | 0.08095 | 0.14571 | 0.21048 | 120.00 | 150.00 | 5.83 | 9.71 | 17.49 | 25.26 | 7.29 | 12.14 | 21.86 | 31.57 |
| | 9 | 0.05464 | 0.09107 | 0.16393 | 0.23678 | 106.67 | 133.33 | | | | | | | | |
| | 10 | 0.06071 | 0.10119 | 0.18214 | 0.26309 | 96.00 | 120.00 | | | | | | | | |
| | 11 | 0.06679 | 0.11131 | 0.20036 | 0.28940 | 87.27 | 109.09 | | | | | | | | |
| | 12 | 0.07286 | 0.12143 | 0.21857 | 0.31571 | 80.00 | 100.00 | | | | | | | | |
| | 13 | 0.07893 | 0.13155 | 0.23678 | 0.34202 | 73.85 | 92.31 | | | | | | | | |

MULTI-PLUNGER PUMPS AND ASSOCIATED DRIVE SYSTEMS

CROSS REFERENCE TO RELATED APPLICATIONS

This application claims priority to and the benefit of U.S. Provisional Patent Application No. 62/594,912, filed Dec. 5, 2017, the full disclosure of which is hereby incorporated by reference herein for all purposes.

BACKGROUND

1. Technical Field

This disclosure relates generally to drive systems for reciprocating plunger-style pumps used in hydraulic fracturing operations, and more particularly to multi-plunger hydraulic fracturing pumps and associated drive systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracking) operations typically require powering numerous components in order to recover oil and gas resources from the ground. For example, hydraulic fracturing usually includes pumps that inject fracking fluid down the wellbore, blenders that mix proppant into the fluid, cranes, wireline units, and many other components that all must perform different functions to carry out fracking operations.

Hydraulic fracturing operations commonly use diesel-powered pumps to transmit fluid media down the well bore, the transmissions for the diesel-powered pumps often having seven speeds or more. When one or more pumps go offline during operation, for example due to system failure or for scheduled maintenance, the speed of the remaining operating pumps is increased accordingly. However, many of the top gears in these diesel transmissions provide speeds that are above the critical speed for the associated plunger pumps. Thus, compensating for the downed pump or pumps by up-shifting operation of the remaining pumps to these higher gears, above the critical speed for the pumps, can result in damage to the pumps. There is a need for hydraulic fracturing pumps that are capable of operation at or below the critical speed, without sacrificing pump rate, efficiency, and efficacy.

SUMMARY

One of the most common transmissions utilized in hydraulic fracturing pump applications is a nine-speed transmission, often driven by a diesel-powered engine. When this transmission is in fifth gear and the engine is running at 1700 rotations per minute (rpm), for example, the critical speed of 120 rpm on an associated 8-inch stroke pump is reached. Therefore, running the pump with the transmission operating in any of gears six through nine, above the critical speed reached at gear five, could cause pump cavitation and damage accumulation to the fluid end of the pump.

It has historically been believed that pump cavitation is caused by air entering the pump. Through testing and data-gathering, however, Applicants have observed that pump cavitation and damage are caused by the formation of vacuum bubbles as a result of fluid being accelerated too fast through the pump. A heightened speed of operation creates low pressure within the pumps, creating vacuum bubbles. As the pump plungers retract, the vacuum bubbles implode, causing damage (cavitation) to the pump and engine systems. Although the risks of operating the pumps at too great of speeds may be known, concerns about lowered pump rates and lost efficiency resulting from maintaining slower transmission speeds commonly lead to disregard of the risks as an unavoidable consequence of maintaining pump efficiency.

In seeking to avoid such pump damage, Applicants have observed that, by operating transmissions such that pumps are maintained at or below critical pump speeds, such formation of vacuum bubbles and resulting pump cavitation and damage may be avoided. Further still, Applicants have observed that use of electric- or hydraulic-powered pumps may allow for better control of pump speeds at or below the critical speed due to the smaller increments between gear speeds as compared to those of pumps driven by diesel-powered engines.

Operation below critical pump speeds has previously been avoided as being considered inefficient and ineffective for pump usage in fracking, as slower pump speeds are historically believed to be directly tied to pump rates. Applicant has observed, however, that the introduction of multiple electric- or hydraulic-powered motors driving planetary gear trains can provide effective and efficient pumping power, thereby maintaining a consistent pump rate for fluid transfer, while also sustaining a pumping speed at or below the critical speed for the plungers. For example, Applicant discovered that varying pump bore sizes and stroke lengths, as well as number of plungers, allowed for operation at slower pump speeds while maintaining or increasing fluid pump rates. Applicant also discovered, through testing and analysis, that certain bore size, stroke length, and plunger number combinations provided maximum pump rate efficiency at a usable and economically effective overall pump size.

The present disclosure is directed to hydraulic fracturing system for fracturing a subterranean formation, according to various embodiments. In an embodiment, the hydraulic fracturing system can include a multi-plunger hydraulic fracturing pump fluidly connected to a well associated with the subterranean formation, and the multi-plunger pump can be configured to pump fluid into a wellbore associated with the well at a high pressure so that the fluid passes from the wellbore into the subterranean formation and fractures the subterranean formation. In an embodiment, the system can further include a plurality of motors positioned to power the multi-plunger pump, and a planetary gear train having a plurality of input pinion gears in rotational contact with each of the plurality of motors. In an embodiment, a gear ratio of the planetary gear train and a speed at which the plurality of motors operates can be selected so as to limit a maximum pump speed associated with the multi-plunger pump.

In an embodiment, the system can include a plurality of speed reduction gearboxes positioned between the plurality of input pinion gears and the plurality of motors so as to achieve a desired pump rate.

In an embodiment, the plurality of motors can include one of a plurality of electric motors or a plurality of hydraulic motors.

In an embodiment, the maximum pump speed can correlate to a critical plunger speed associated with each of the plurality of hydraulic pumps.

In an embodiment, the maximum pump speed can be 5% or less over a critical plunger speed associated with each of the plurality of hydraulic pumps.

In an embodiment, the plurality of hydraulic pumps includes an odd number of plungers greater than or equal to five plungers.

In an embodiment, a stroke length of each of the plungers associated with the plurality of hydraulic pumps can be selected to inversely relate to a pump speed associated with the plurality of hydraulic pumps so as to achieve a predetermined flow rate.

In an embodiment, the system can include a variable frequency drive (VFD) connected to the plurality of motors to control the speed of the plurality of motors. The VFD can be positioned to accelerate or decelerate pump rotational speeds associated with each of the plurality of hydraulic pumps, according to an embodiment.

In an embodiment, the VFD can include a plurality of VFDs and the plurality of VFDs can be configured to share a load required to power the plurality of hydraulic pumps.

In an embodiment, the plurality of VFDs can be configured to automatically shut off in the event of an overpressure event with respect to the plurality of hydraulic pumps.

The present disclosure is also related to a hydraulic fracturing system for fracturing a subterranean formation, according to an embodiment. In an embodiment, the system can include a multi-plunger hydraulic fracturing pump fluidly connected to a well associated with the subterranean formation, and the multi-plunger pump can be configured to pump fluid into a wellbore associated with the well at a high pressure so that the fluid passes from the wellbore into the subterranean formation and fractures the subterranean formation. In an embodiment, a plurality of motors can be positioned to power the multi-plunger pump. The system can further include a variable frequency drive connected to the plurality of motors to control the speeds of the plurality of electric motors, according to an embodiment. In an embodiment, the system can include a planetary gear train having a plurality of input pinion gears in rotational contact with each of the plurality of motors. In an embodiment, a gear ratio of the planetary gear train and a speed at which the plurality of motors operates can be selected so as to limit a maximum pump speed associated with the multi-plunger pump.

The present disclosure is also directed to a method for pumping fluid into a wellbore associated with a subterranean formation. In an embodiment, the method can include fluidly connecting a multi-plunger hydraulic fracturing pump to a well associated with the subterranean formation such that the multi-plunger pump pumps fluid into the wellbore at a high pressure so that fluid passes from the wellbore into the subterranean formation and fractures the subterranean formation. In an embodiment, the method can include powering the multi-plunger pump with a plurality of motors. In an embodiment, the method can further include providing a planetary gear train having a plurality of input pinion gears in rotational contact with each of the plurality of motors so as to translate power from the plurality of motors into a desired pump rate of the multi-plunger pump.

Other aspects and features of the present disclosure will become apparent to those of ordinary skill in the art after reading the detailed description herein and the accompanying figures.

BRIEF DESCRIPTION OF DRAWINGS

Some of the features and benefits of the present invention having been stated, others will become apparent as the description proceeds when taken in conjunction with the accompanying drawings, in which:

FIG. 4 is a table showing calculations of plunger pump critical speeds according to embodiments of the present technology.

FIG. 5 is a table showing data related to certain pumps and transmissions in an example application, meant to highlight certain embodiments of the present technology.

FIGS. 6-10 are tables showing additional data related to certain pumps and transmissions in further example applications, meant to further highlight embodiments of the present technology.

While the invention will be described in connection with the preferred embodiments, it will be understood that the included description is not intended to limit the invention to the described preferred embodiments. On the contrary, the description is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein: rather, these embodiments are provided so that this disclosure will be thorough and complete, and will fully convey its scope to those skilled in the art. Like numbers refer to like elements throughout.

It is to be further understood that the scope of the present disclosure is not limited the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein is an example of a method and system for providing reciprocating, plunger-style pumps as part of a multi-plunger system for use in hydraulic fracturing operations. Also described are various drive systems for use with the described reciprocating, plunger-style pumps. In various embodiments, the pumps and drive systems may be utilized by conventionally powered (i.e., diesel engine-driven) hydraulic fracturing pumping systems, or in other embodiments by hydraulically powered or electrically powered hydraulic fracturing pumping systems.

Multi-plunger hydraulic fracturing pumps, though known in the art, are typically limited to either triplex (three plungers) or quintuplex (five plungers) arrangements. Common hydraulic fracturing pumps often utilize 8-inch, 10-inch, and 11-inch stroke triplex and quintuplex hydraulic fracturing pumps. Hydraulic fracturing pumps are commonly driven by an engine (usually a 2500 horsepower (HP) diesel engine) and a multiple speed transmission, usually having seven speeds or more. However, many of the top gears, depending on the manufacturer and gear ratios, provide speeds that are above the critical speed of a plunger pump. FIG. 4 details calculations of such plunger critical speeds.

For example, one of the most common transmissions utilized in hydraulic fracturing pump applications is the Caterpillar model TH55-E90, which is a 9-speed transmission. As shown in FIG. 5, when this transmission is in $5^{th}$ gear and the engine is operating at 1700 rpm, the critical speed of 120 rpm on an 8-inch stroke pump is reached. Therefore, running the pump with the transmission in any of gears 6 through 9 could cause pump cavitation and damage accumulation to the fluid end.

Figure 8:
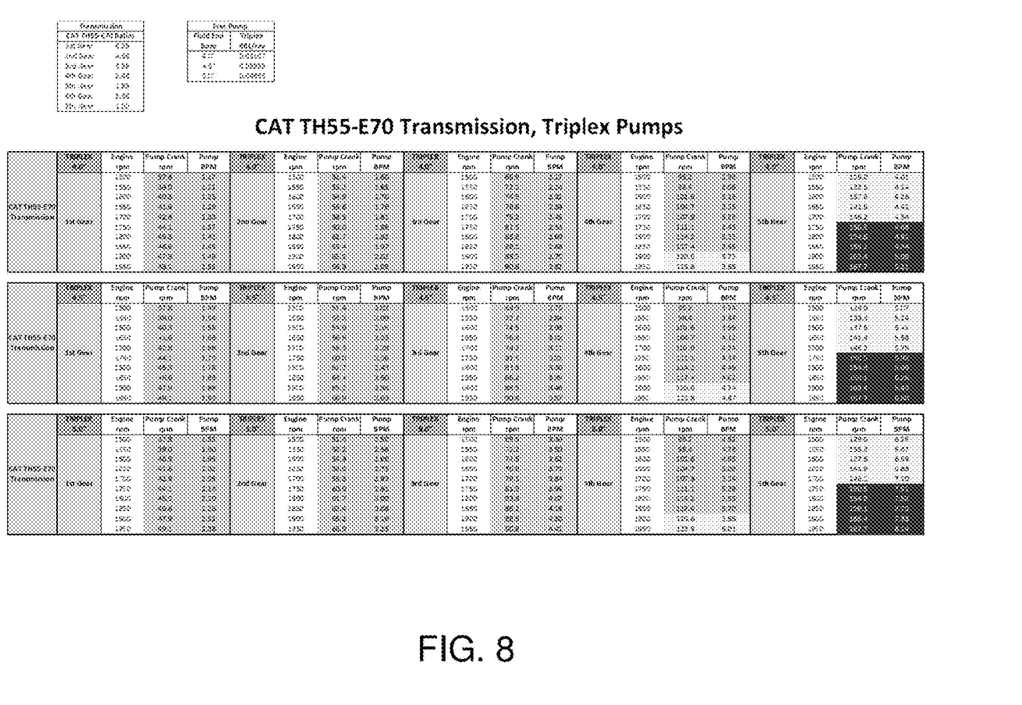
Figure 9:
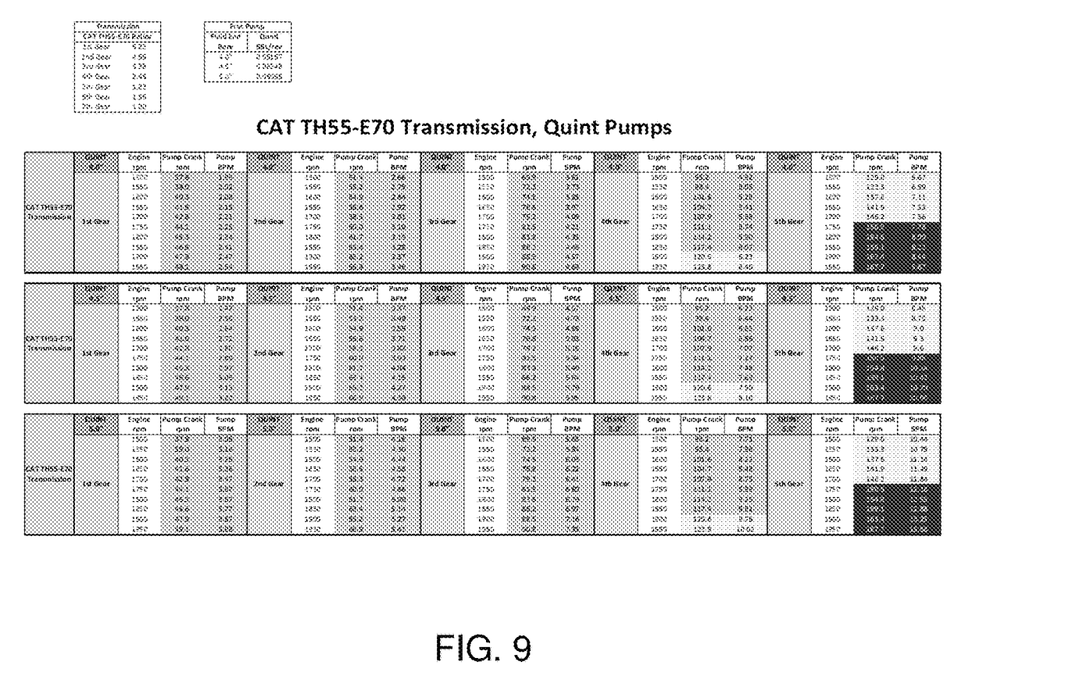

Similarly, the common hydraulic fracturing application transmissions known in the art may exhibit the same issues in higher gears, as shown below in FIGS. 6-10. For example, as shown in FIG. 6 and FIG. 7, the critical plunger speed is reached in the $3^{rd}$ gear, such that use of gears 4-7 may cause cavitation and damage accumulation. Similarly, as shown in FIG. 8 and FIG. 9, the critical plunger speed is reached in the $4^{th}$ gear, such that use of gears 5-7 may cause cavitation and damage accumulation. In FIG. 10, the critical plunger speed is reached in the $4^{th}$ gear, such that use of gears 5-9 may result in cavitation and damage accumulation.

Use of the multi-plunger hydraulic fracturing pumps according to the present disclosure may eliminate the need for a diesel engine and transmission. As shown above, diesel engines and transmissions often include multiple gears that accelerate the plunger speed above critical operating speeds. This elimination of the typical engine and transmission from hydraulic fracturing pump units may enable the pumps to be driven by multiple electric motors, according to some embodiments, or multiple hydraulic motors according to other embodiments. These electric or hydraulic motors may have fewer gears such that operation in gears that increase the plunger speeds above their critical speeds can be avoided. By using multiple motors, whether hydraulic or electric, to drive a single pump, pump rates can be increased without exceeding critical plunger speeds.

Use of electric or hydraulic motors, rather than diesel motors, may also make maintenance, repair, and replacement of the electric motors safer and faster than single or double electric motor-driven pumps. This configuration may prevent the fracturing pumps from being run at speeds higher than the critical plunger speed, which may help to minimize pump cavitation and damage accumulation, thus greatly extending the usable life of the pump fluid ends. For example, as discussed in more detail below, the system could be designed to allow only a slight overspeed of the pumps beyond the identified critical pump speed as a safety margin in the event that one of the fleet's pumps were taken offline for repairs or maintenance, and an additional rate of the remaining online pumps were required to complete the stage being pumped.

In the multiple electric motor-driven embodiment of the present disclosure, the electric motors may directly drive the pump, and the gear ratios of the planetary drive along with the electric motor-rated speeds may be chosen to limit the maximum pump speed, so as to not exceed the plunger critical speed. However, the gear ratios and electric motor-rated speeds may also be chosen to allow only a slight percentage of overspeed (higher than critical plunger speed) as a safe margin to enable a fleet of operating pumps to achieve a desired pump rate, for example when one pump is taken off line, as is often the case in hydraulic fracturing. For example, the gear ratios and electric motor-rated speeds may be chosen to operate 5% or less above the critical plunger speed according to some examples; 10% or less above the critical plunger speed according to some examples; or any other acceptable range as will be readily understood by one having ordinary skill in the art. Repairs or maintenance are generally performed as quickly as possible so that the offline pump is available by the next sequential fracturing stage. This same logic could be applied to the hydraulic motor driven system or the system that utilizes speed reduction gearboxes driving a single ring gear.

By the present disclosure, multi-plunger hydraulic fracturing pumps utilizing higher multiples of plungers, such as 7, 9, 11, 13, etc. (septenplex, novenplex, undenplex, tredenplex, etc.), are described. In some embodiments, more than 13 plungers may be utilized, as will be readily understood by one having ordinary skill in the art. In some embodiments, odd numbers of plungers may be chosen so that the pump flow ripple magnitude is minimized. For example, in multi-plunger hydraulic fracturing pumps having higher numbers of plungers, the plunger ripple frequency may be increased, thereby reducing the amount of time between ripples, which may provide a smoother pressure performance for the pumps.

In some embodiments, longer stroke lengths of the plunger pumps may be utilized to reduce plunger speed. For example, a 10-inch stroke pump of a given plunger size may be run at a slower speed than an 8-inch stroke pump of the same plunger size, in order to accomplish the same flow rate. Slowing the plunger down may also decrease the possibility of pump cavitation. For example, when triplex and quintuplex pumps, as are known in the art, are operated at higher rates, conditions for cavitation to occur are measurably higher. According to an embodiment, a critical pump speed may be 120 rpm of the pump crankshaft. With this pump speed, on the currently used 8-inch stroke pumps, the rotational speed translates to an average linear speed of the plungers at a velocity of 32 inches per second. At higher speeds, with every stroke of the plungers, fluid is accelerated into and out of the pump fluid end, creating a likelihood of low pressure regions within the fluid end that approach or dip below vapor pressure values for the fluid, thereby causing cavitation, and ultimately damage accumulation, to occur. The use of longer stroke plungers accordingly contributes critically to longer fluid end life.

Various drive systems for powering multi-plunger hydraulic fracturing pumps are contemplated. According to an embodiment, multiple electric motors may be utilized to power the multi-plunger hydraulic fracturing pump. The number of motors utilized may be selected based on the output hydraulic horsepower for which the pump is designed, in some examples. In other examples, the number of motors could be determined on an "n plus 1" basis, in which "n" number of motors would be adequate to provide enough input power according to the output hydraulic horsepower for which the pump is designed, and one ("1") additional motor would be included to allow for a single motor failure or maintenance situation. In such a situation, the failed motor (or motor purposefully removed for maintenance) could be disconnected from the electrical circuit and allowed to freewheel, while the remaining operational motors would still provide adequate power for the pump, according to an embodiment.

Figure 1:
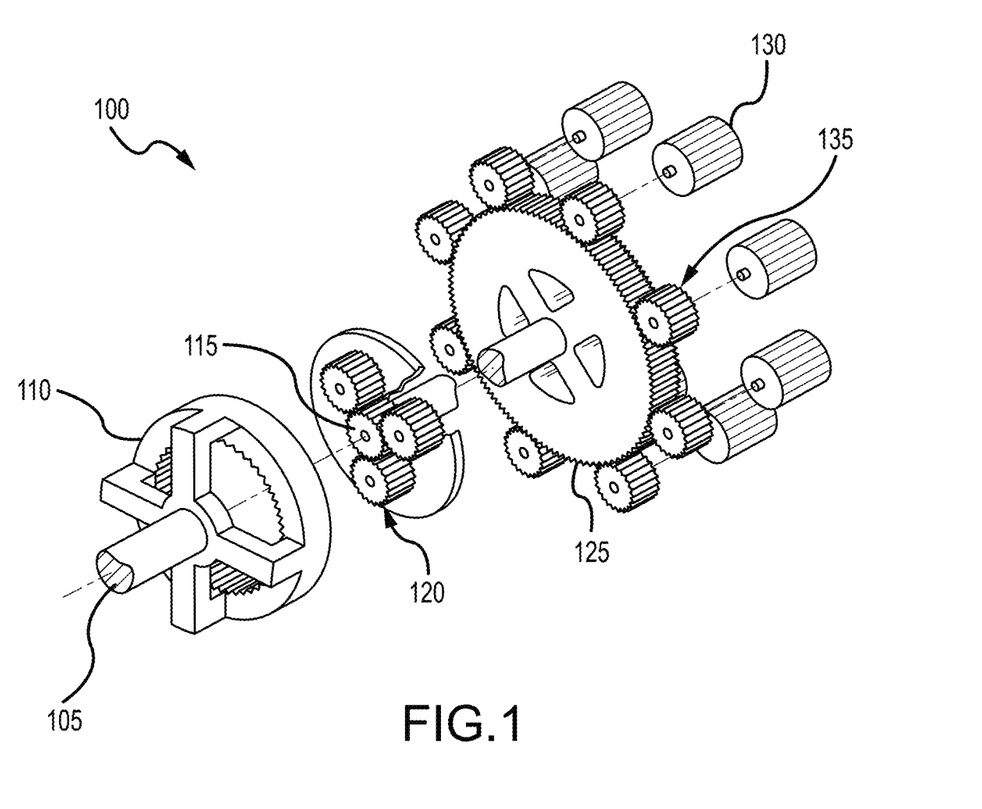
FIG. 1 is an exploded schematic example of a planetary gear train having multiple input pinions for direct connection to an electric motor, according to an embodiment.

In the example illustrated in FIG. 1, an exploded schematic view shows an embodiment of a planetary gear train 100 in which the multiple input pinion gears 135 are directly connected to the electric motors 130. According to the illustrated embodiment, both ends of the pump crankshaft 105 may be powered with an identical planetary gear train 120 and electric motors 130 to enable the motors 130 to be sized small enough to simplify motor removal and installation as compared to a larger single electric motor, or a double electric motor drive system.

Figure 3:
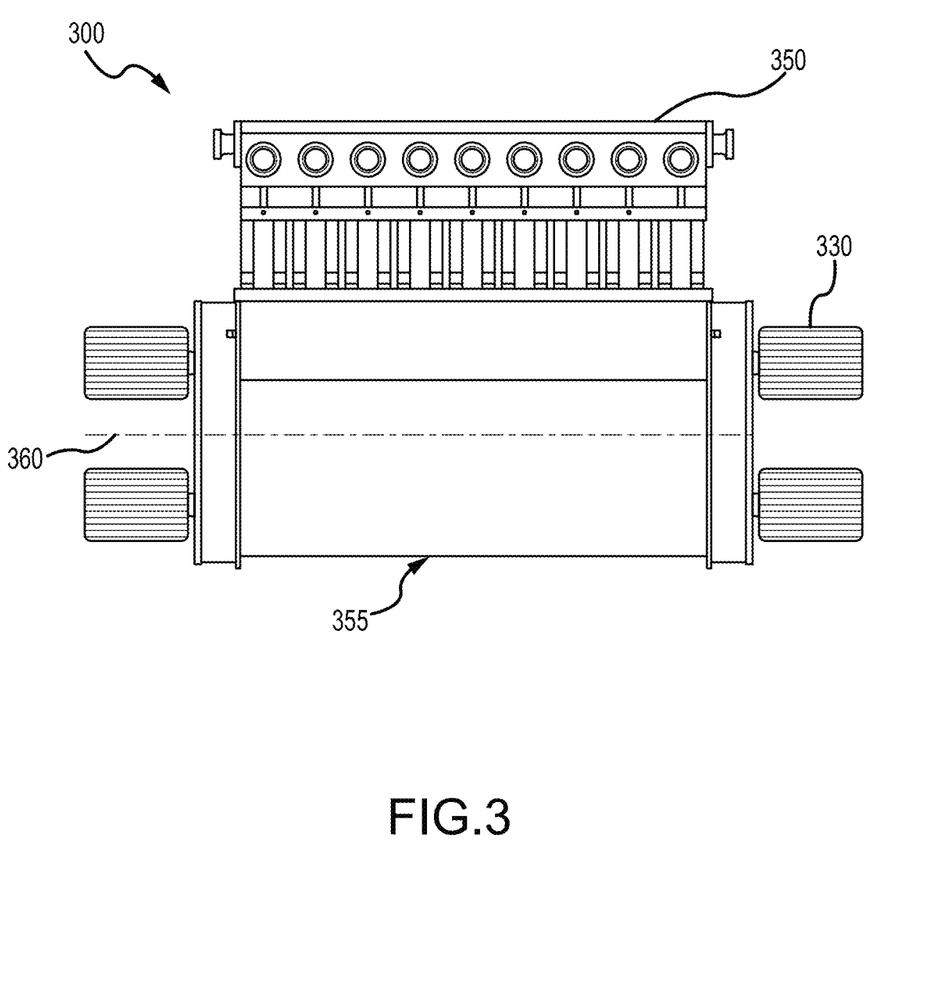
FIG. 3 is a schematic example of a multi-plunger pump having nine plungers and four electric motors mounted for driving the multi-plunger pump, according to an embodiment.

In the illustrated embodiment of FIG. 1, eight electric motors 130 may correspond to and drive eight input pinion gears 135 associated with a single main planetary gear 125. The main planetary gear 125 may in turn drive the sun gear 115 positioned central to three planetary gears 120. The final drive gear 110 may have internal gear teeth positioned to catch the external gear teeth of the three planetary gears 120, which may cause rotation of the pump crankshaft 105. In this way, a plurality of electric motors 130 may provide power to a pump crankshaft 105, which may in turn drive a multi-plunger pump, for example as illustrated in FIG. 3 and discussed in greater detail below.

In another embodiment, multiple hydraulic motors may be utilized to power a multi-plunger hydraulic fracturing pump, in which a planetary gear train system 100 similar to that illustrated in FIG. 1 could also be utilized. In an example, a planetary gear train system may be utilized on one or both ends of the pump crankshaft to allow for smaller hydraulic motors to be utilized.

Figure 2:
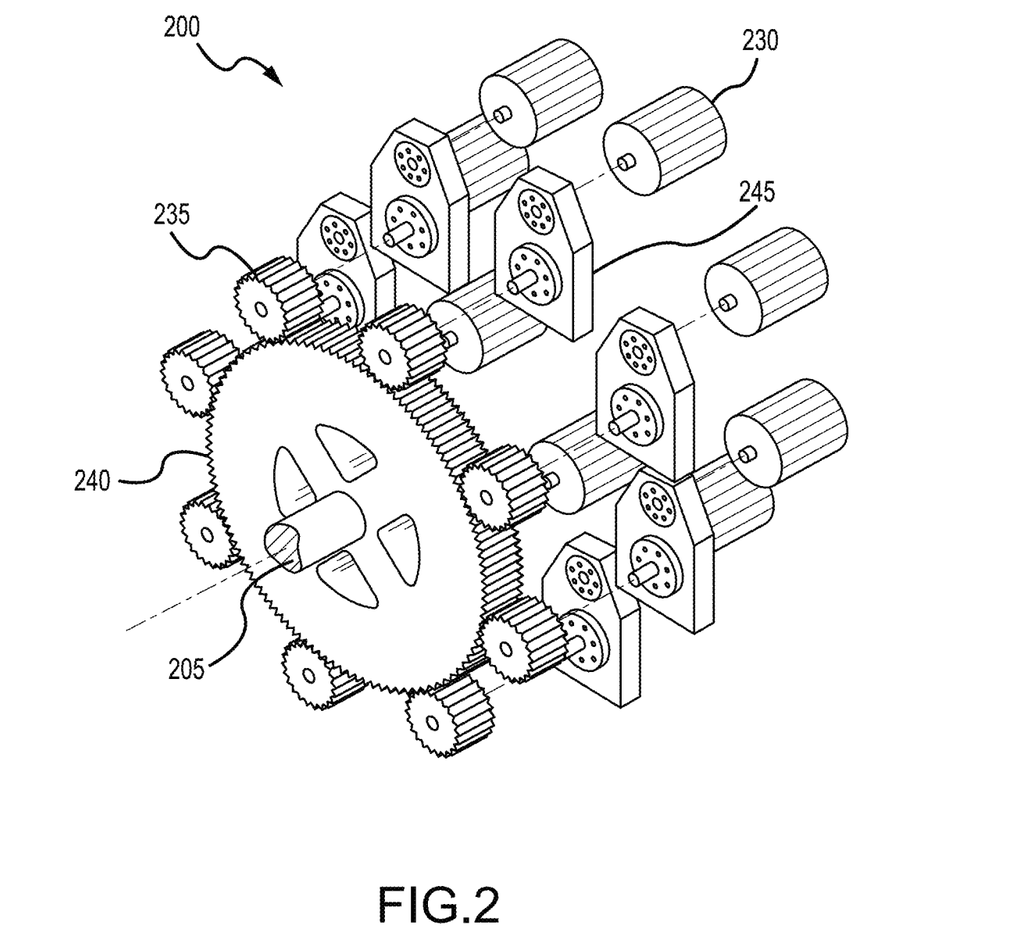
FIG. 2 is an exploded schematic example of a planetary gear train having a speed reduction gearbox mounting for connection to an electric motor, according to an embodiment.

According to an alternate embodiment, for example as illustrated in FIG. 2, a plurality of electric motors or hydraulic motors 230 each may be mounted to a plurality of speed reduction gearboxes 245. FIG. 2 illustrates an exploded schematic example of a planetary gear train 200 having a plurality of speed reduction gearbox 245 mountings for connection to a plurality of electric motors 230, according to an embodiment. The speed reduction gearboxes 245 may, in turn, power a single ring gear 240 to turn the pump crankshaft 205 at the proper rpm needed to drive the multi-plunger pumps at the desired pump rate. In some examples, this configuration may not require use of a multi-planetary gear train system as described above and illustrated in FIG. 1, for example. For example, as illustrated in the embodiment of FIG. 2, the plurality of electric motors 230 may drive the main planetary gear in the form of a ring gear 240 through speed reduction gearboxes 245, and the ring gear 240 may directly turn the pump crankshaft 205. In such an example additional planetary gears 120, as illustrated in the embodiment of FIG. 1, for example, may not be included.

In an embodiment utilizing multiple electric motors, the fleet of fracturing pumps may be powered by multiple electric motors, and overall electric power may be generated by one or more diesel or gas turbines. When the pumps are being brought online to pump fluids into the well, the power may be switched via appropriate switchgear to the electric motors.

In some embodiments, the speed of the motors may be controlled by one or more variable frequency drives (VFD), which may accelerate or decelerate the pump rotational speeds using an S curve. The pump operator may select the various pump speeds via a human-machine interface (HMI) according to some embodiments, for example from inside a data van, or from a "suitcase," which is a portable, stand-alone HMI. The HMI or suitcase may allow on/off control of the pumps as well as speed control of the pumps, to allow the pumps to run at speeds from zero crankshaft rpm up to the maximum speed, which would correlate with the plunger critical speed.

According to an embodiment, one of the VFDs may be designated as the master VFD, and the remaining VFDs may be designed to share the load required to power the pump under all load conditions. In the case of an overpressure event, the hydraulic fracturing controls may automatically turn the VFD off using the on/off signal for rapid shutdown, instead of using the rpm command, which uses an S curve to control the acceleration and/or deceleration. A manual emergency shutdown may also be included, which uses an HMI (such as a push button or other HMI, which may be electronic and/or manual) to shut off the VFD using the on/off function. This manual emergency shutdown feature may be configured to shut down all VFDs simultaneously, thereby shutting down the entire site. The emergency shutdown may also be configured to stop the VFD on the blender discharge pumps, and may or may not be tied into the electrical microgrid to open breakers, thereby stopping the flow and/or generation of electricity and/or gas compression.

The HMI may be designed to allow only a slight percentage of overspeed (higher than critical plunger speed) as a safe margin to enable a fleet of operating pumps to achieve a desired pump rate when one pump is taken offline, for example, as is often the case in hydraulic fracturing. Repairs or maintenance are generally performed as quickly as possible so that the offline pump is available by the next sequential fracturing stage. This same logic could be applied to the hydraulic motor driven system or the system that utilizes speed reduction gearboxes driving a single ring gear.

FIG. 3 illustrates a schematic example of a multi-plunger pump 300 with four electric motors mounted to the pump for driving the multi-plunger pump, according to an embodiment. In the illustrated embodiment, the multi-plunger pump 300 may include nine plungers positioned at the multi-plunger fluid end 350 of the multi-plunger pump 300. In other embodiments, various other numbers of plungers may be included, as will be readily understood by one having ordinary skill in the art.

A crankshaft centerline 360 may bisect the multi-plunger pump 300 between the multi-plunger fluid end 350 and the pump power end 355. Two electric motors 330 may be positioned on opposing sides of the multi-plunger pump 300, across the crankshaft centerline 360. The four total electric motors 330 may drive the crankshaft associated with the nine plungers, as described above with respect to FIGS. 1 and 2. For example, in some embodiments the four electric motors 330 may drive the crankshaft via one or more planetary gear trains. In some embodiments, a plurality of speed reduction gearboxes may be positioned between the electric motors 330 and the one or more planetary gear trains so as to control the rotational speed of the one or more planetary gear trains and, ultimately, the pump rate of the plungers.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation comprising:
    a multi-plunger hydraulic fracturing pump fluidly connected to a well associated with the subterranean formation, the multi-plunger pump configured to pump fluid into a wellbore associated with the well at a high pressure so that the fluid passes from the wellbore into the subterranean formation and fractures the subterranean formation;
    a plurality of motors positioned to simultaneously power the multi-plunger pump; and
    a planetary gear train having a plurality of input pinion gears in rotational contact with each of the plurality of motors,
    wherein a gear ratio of the planetary gear train and a speed at which the plurality of motors operates are selected so as to limit a maximum pump speed associated with the multi-plunger pump.

2. The system of claim 1, the system further comprising a plurality of speed reduction gearboxes positioned between the plurality of input pinion gears and the plurality of motors so as to achieve a desired pump rate.

3. The system of claim 1, wherein the plurality of motors comprises one of a plurality of electric motors or a plurality of hydraulic motors.

4. The system of claim 1, wherein the maximum pump speed correlates to a critical plunger speed associated with the multi-plunger hydraulic fracturing pump.

5. The system of claim 1, wherein the maximum pump speed is 5% or less over a critical plunger speed associated with the multi-plunger hydraulic fracturing pump.

6. The system of claim 1, wherein the multi-plunger hydraulic fracturing pump comprises an odd number of plungers greater than or equal to five plungers.

7. The system of claim 6, wherein a stroke length of each of the plungers associated with the multi-plunger hydraulic fracturing pump is selected to inversely relate to a pump speed associated with the multi-plunger hydraulic fracturing pump so as to achieve a predetermined flow rate.

8. The system of claim 1, further comprising:
    a variable frequency drive (VFD) connected to the plurality of motors to control the speed of the plurality of motors, wherein the VFD is positioned to accelerate or decelerate pump rotational speeds associated with the multi-plunger hydraulic fracturing pump.

9. The system of claim 8, wherein the VFD comprises a plurality of VFDs and wherein the plurality of VFDs are configured to share a load required to power the multi-plunger hydraulic fracturing pump.

10. The system of claim 9, wherein the plurality of VFDs are configured to automatically shut off in the event of an overpressure event with respect to the multi-plunger hydraulic fracturing pump.

11. A hydraulic fracturing system for fracturing a subterranean formation comprising:
    a multi-plunger hydraulic fracturing pump fluidly connected to a well associated with the subterranean formation, the multi-plunger pump configured to pump fluid into a wellbore associated with the well at a high pressure so that the fluid passes from the wellbore into the subterranean formation and fractures the subterranean formation;
    a plurality of motors positioned to simultaneously power the multi-plunger pump;
    a variable frequency drive connected to the plurality of motors to control the speeds of the plurality of motors; and
    a planetary gear train having a plurality of input pinion gears in rotational contact with each of the plurality of motors,
    wherein a gear ratio of the planetary gear train and a speed at which the plurality of motors operates are selected so as to limit a maximum pump speed associated with the multi-plunger pump.

12. The system of claim 11, the system further comprising a plurality of speed reduction gearboxes positioned between the plurality of input pinion gears and the plurality of motors so as to achieve a desired pump rate.

13. The system of claim 11, wherein the plurality of motors comprises one of a plurality of electric motors or a plurality of hydraulic motors.

14. The system of claim 11, wherein the maximum pump speed correlates to a critical plunger speed associated with the multi-plunger hydraulic fracturing pump.

15. A method for pumping fluid into a wellbore associated with a subterranean formation, the method comprising:
    fluidly connecting a multi-plunger hydraulic fracturing pump to a well associated with the subterranean formation such that the multi-plunger pump pumps fluid into the wellbore at a high pressure so that fluid passes from the wellbore into the subterranean formation and fractures the subterranean formation;
    simultaneously powering the multi-plunger pump with a plurality of motors;
    providing a planetary gear train having a plurality of input pinion gears in rotational contact with each of the plurality of motors so as to translate power from the plurality of motors into a desired pump rate of the multi-plunger pump.

16. The method of claim 15, further comprising:
    positioning a plurality of speed reduction gearboxes between the plurality of input pinion gears and the plurality of motors so as to achieve the desired pump rate.

17. The method of claim 15, wherein the plurality of motors comprises one of a plurality of electric motors or a plurality of hydraulic motors.

18. The method of claim 15, wherein the maximum pump speed correlates to a critical plunger speed associated with the multi-plunger hydraulic fracturing pump.

19. The method of claim 15, further comprising:
    connecting a variable frequency drive (VFD) to the plurality of motors so as to control the speed of the plurality of motors, wherein the VFD is positioned to accelerate or decelerate pump rotational speeds associated with the multi-plunger hydraulic fracturing pump.

20. The method of claim 19, the method further comprising:
    detecting an overpressure event with respect to the multi-plunger hydraulic fracturing pump; and
    automatically shutting off the VFD.

* * * * *